J. A. PRINCE AND A. L. GILLES.
VEHICLE TIRE.
APPLICATION FILED APR. 4, 1919.
1,346,766.
Patented July 13, 1920.
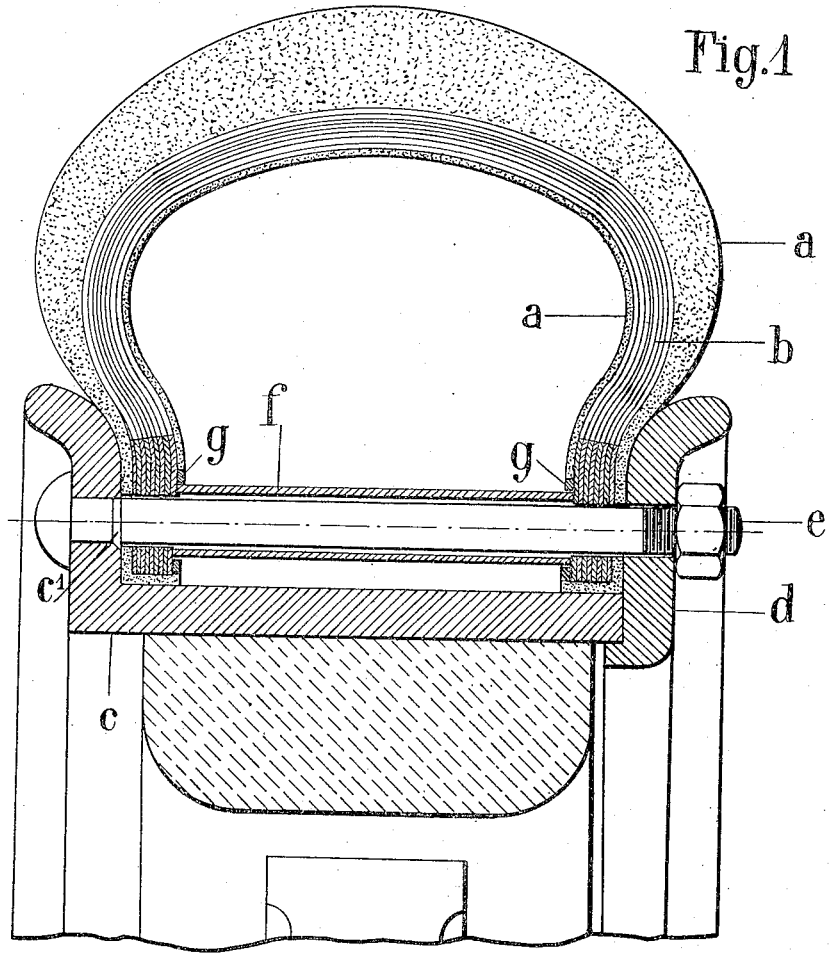
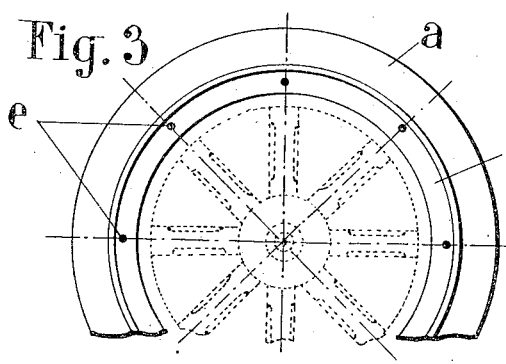
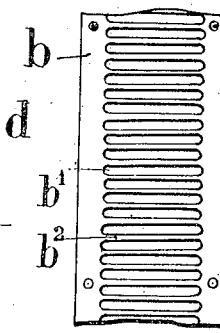
Inventor:
Jean A. Prince and
Albert L. Gilles.
by Wilkinson & Giusta
Attorneys.

UNITED STATES PATENT OFFICE.

JEAN AUGUSTE PRINCE AND ALBERT LOUIS GILLES, OF NICE, FRANCE.

VEHICLE-TIRE.

1,346,766.  Specification of Letters Patent.  Patented July 13, 1920.

Application filed April 4, 1919. Serial No. 287,476.

*To all whom it may concern:*

Be it known that we, JEAN AUGUSTE PRINCE and ALBERT LOUIS GILLES, citizens of the Republic of France, both residing at 16 Rue d'Angleterre, Nice, Alpes-Maritimes, France, have invented new and useful Improvements in and Relating to Vehicle-Tires, of which the following is a specification.

The object of the present invention is to construct an elastic tire which, while being capable of being adapted to all kinds of vehicles, allows the air-tube to be dispensed with.

The characteristic feature of this tire resides in the fact that it comprises as novel element a particular arrangement of metallic spring which gives the tire the necessary elasticity.

The invention is also characterized by a particular method of mounting the tread, constructed as described, on the rim of the wheel.

The accompanying drawing shows, but merely by way of example and in no way limitatively, a tire constructed according to the invention.

Figure 1 is a vertical section of the tire mounted on a wheel.

Fig. 2 is a view of the development of one of the springs.

Fig. 3 is a view of the wheel as a whole.

$a$ designates the tread, of rubber combined with cloth, leather or any other suitable and usual material, in which is or are sunk the spring or springs $b$, of which the development is shown in Fig. 2. Each of these springs consists of a steel band, of desired width, in which are formed slots $b^1$, in such a manner as to leave strips $b^2$ which form the elastic portions proper of the spring. These springs, the number of which is determined by the resistance which the tire is required to present according to the weight and the nature of the vehicle, are either single or superposed in such a manner as to form series which are placed side by side in the tread $a$. The marginal portions of these springs are solid instead of being perforated. These springs are bent in such a manner as to adopt the form of a tire as shown in Fig. 1, when they are sunk in the said tread. They could also be made either in one piece cut from a sheet of metal or they could be made in several pieces fastened together.

The tread can be given any desired form, but that shown in the drawing is preferred. It is mounted on the usual rim $c$ having a cheek $d$ which is attached by means of bolts $e$.

The mounting of each bolt $e$ presents a peculiar feature in so far as it is fixed to the rim $c$ by a collar $c^1$ which renders the bolt solid with the wheel. The said bolt passes through the marginal portions of the springs $b$ and over it is slipped a sleeve $f$ which plays the part of a stay and holds the tread in place on the rim.

If desired, metal washers $g$ can be sunk in the material of the tread $a$ and the extremities of the sleeves $f$ would center themselves in these washers, the object being to retain the sleeves in place.

In order to dis-assemble the tire, the nuts are removed from the bolts $e$, the cheek $d$ is removed and the tire is withdrawn, comprising the whole of the tread $a$, its springs $b$ and the sleeves $f$, the bolts themselves remaining in place. In order to assemble the tire, the procedure is the opposite.

It will be understood that the springs need not be sunk in the material, but could be simply placed against the inner wall thereof. In other words, the tread would be mounted freely upon them.

Finally the elasticity of the springs will be calculated by the designer according to the loads to be carried by the vehicles provided with this type of tire.

Claim:

A vehicle tire comprising, in combination, a tread, elastic members sunk in the material of said tread, bolts permanently fixed to the wheel and passing through the tread and the elastic members, sleeves on said bolts serving as stays between the edges of the elastic members and washers for holding said sleeves in position.

JEAN AUGUSTE PRINCE.
ALBERT LOUIS GILLES.

Signed in the presence of—
PETER PETERSEN.